Feb. 11, 1941.  E. S. SCHWAB  2,231,641
GLARE AND LIGHT SHIELD FOR USE WITH AN AUTOMOBILE VISOR
Filed Oct. 2, 1939
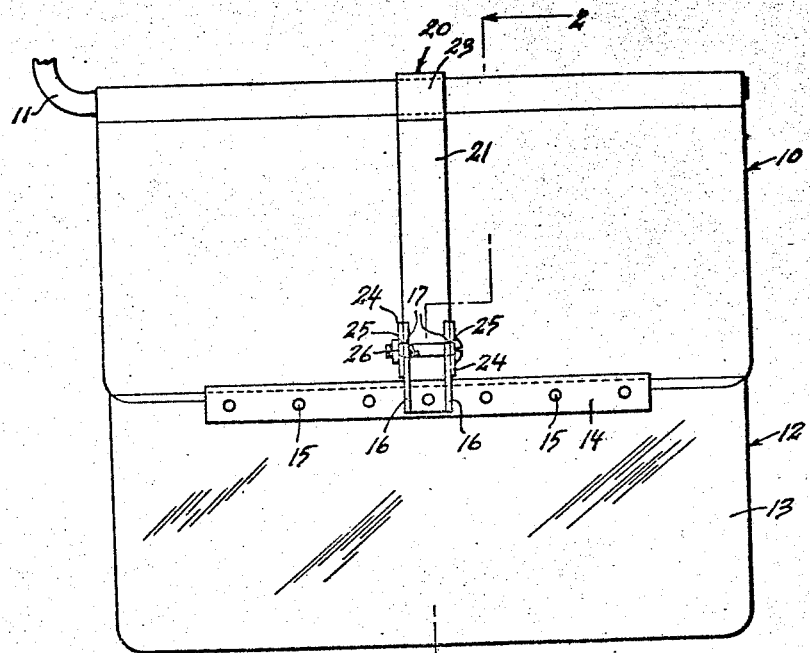
Fig. 1.
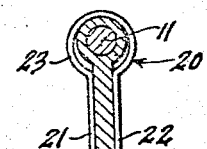
Fig. 2.
Ernest Stevens Schwab Inventor
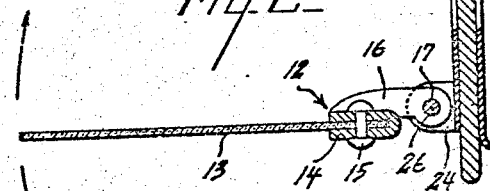
Attorney Patented Feb. 11, 1941

2,231,641

UNITED STATES PATENT OFFICE 2,231,641

GLARE AND LIGHT SHIELD FOR USE WITH AN AUTOMOBILE VISOR

Ernest Stevens Schwab, Assumption, Ill.

Application October 2, 1939, Serial No. 297,553

1 Claim. (Cl. 296—97)

This invention relates to automobile visors and more particularly to an auxiliary glare and light shield device for use therewith.

The object of this invention is to provide a readily attachable and detachable glare and light shield device for use with a conventional automobile visor and so designed as to be adjustable in a variety of positions when mounted on said visor, the shield being formed of a transparent material of such a color and character as to eliminate all glare and the objectionable rays of light, the device being especially adaptable for use in night driving to obviate the glare of the headlights of approaching automobiles or when driving into the sun when the same is low as during the early morning and late afternoon hours.

With the foregoing and other objects in view, the invention resides in the novel arrangement and combination of parts and in the details of construction hereinafter described and claimed, it being understood that changes in the precise embodiment of the invention may be made within the scope of what is claimed without departing from the spirit of the invention.

A practical embodiment of the invention is illustrated in the accompanying drawing, wherein:

Figure 1 shows the glare and shield device mounted on visor of automobile, and

Figure 2 is a sectional view taken on line 2—2, Figure 1.

Referring to the drawing, 10 denotes a conventional visor customarily provided as standard equipment in an automobile, such visor being usually formed of a cloth covering placed over a stiff backing, the whole being mounted on a rod 11 for pivotal up and down movement thereon, the rod 11 being in turn supported on a bracket (not shown) for swinging movement in a horizontal plane whereby the visor 10 may be placed either in front of or to the left side of the driver, all in the manner well known.

Such visors are in most cases satisfactory but fall short in relieving the driver of glare resulting from the head lights of approaching cars during night driving as well as from the glare and the direct rays of the sun when driving into the same as during the early morning or late afternoon hours. To obviate this shortcoming, there is provided an auxiliary shield device 12 which consists of a sheet 13 of transparent material such as glass, Celluloid or other suitable transparent material of any desired size, but preferably of a length and width not exceeding the length and width of the standard visor.

The upper edge portion of the shield 13 is positioned within a metallic channel shaped supporting bar 14 and rigidly secured thereto as by the rivets 15. Preferably the bar 14 is of a length less than the length of the shield 13 and is centrally positioned thereon. Formed integral or otherwise suitably attached to the bar 14 is a pair of rearwardly directed arms 16 each provided at their free end portion with an opening 17, both said openings being in aligned registering relation.

For mounting the shield 13 on the visor 10 there is provided a U-shaped spring clip 20 formed of flat spring stock comprising front and rear legs 21 and 22, of a length slightly less than the width of the visor, the legs being joined at their upper ends by a curved bight portion 23 of a size such as to permit ready placement of the clip on said visor which is slipped thereover in a downwardly direction in the manner clearly shown. Formed in the lower end of the front leg 21, are a pair of parallel arms 24 normal to the plane of the front leg 21 and each provided with an opening 25, with both openings in aligned registering relation. The distance between the leg arms 24 is such as to snugly receive therebetween in frictional engagement the bar arms 16 which latter are secured to the former by means of a bolt 26 inserted through the registering openings 17 and 25.

In the placement of the shield device 12 on the visor 10 the front leg 21 of the clip 20 is positioned on the side of the visor normally facing the driver. The parts of the shield device 12 are so designed and dimensioned that in the mounted position thereof with the shield 13 depending vertically in parallel relation to the visor 10, the upper edge portion of the shield 13 will overlap the lower edge portion of the visor, see Figure 1, whereby no gap can exist between the shield and visor for the passage of light therebetween.

As shown in Figure 2, the shield may be adjusted into any desired angular position, being held therein by virtue of the frictional interengagement of the leg and bar arms 24 and 16.

Having thus described my invention, I claim as new and desire to secure by Letters Patent:

An auxiliary glare and light shield device for use with a visor comprising a sheet of transparent material, a bar member of channel form adapted to receive therein the upper edge portion of said sheet and being of a length less than the width of said sheet, means rigidly connecting said sheet to said bar member, a clip member of inverted U-form comprising front and rear resilient legs adapted to engage the corresponding sides of said visor, the free ends of said legs lying adjacent the lower edge of said visor, a pair of parallel arms integral with the lower end of said front leg and normal to the plane thereof, a pair of parallel rearwardly directed arms formed integral with said bar member and positioned medially thereof, both said pairs of arms being so constructed and arranged as to frictionally engage each other, and pivot means connecting said pairs of arms for relative movement of said sheet and clip about an axis parallel to the plane of said sheet and visor.

ERNEST STEVENS SCHWAB.